US006829351B1

United States Patent
Shu et al.

(10) Patent No.: US 6,829,351 B1
(45) Date of Patent: Dec. 7, 2004

(54) APPARATUS AND METHOD OF REPLACING TELEPHONY CARDS WITHOUT DOWN TIME

(75) Inventors: Kuang-I Shu, Holmdel, NJ (US); Xu Wang, Plano, TX (US); Lewis E. Robinson, Jr., Dallas, TX (US)

(73) Assignee: Santera Systems, Inc., Plano, TX (US)

( * ) Notice: Subject to any disclaimer, the term of this patent is extended or adjusted under 35 U.S.C. 154(b) by 621 days.

(21) Appl. No.: 09/639,180

(22) Filed: Aug. 15, 2000

(51) Int. Cl.[7] .............................................. H04M 5/00
(52) U.S. Cl. ...................................... 379/279; 379/325
(58) Field of Search ................................. 379/279, 325, 379/326, 331, 9.05, 243

(56) References Cited

U.S. PATENT DOCUMENTS

| 5,748,426 A | * | 5/1998 | Bedingfield et al. | ............ 361/58 |
| 6,337,847 B1 | * | 1/2002 | Vitaloni | ............... 370/217 |
| 6,351,452 B1 | * | 2/2002 | Koenig et al. | ............... 370/217 |

FOREIGN PATENT DOCUMENTS

| DE | 197 54 903 C1 | 1/1999 |
| EP | 1 133 136 A2 | 9/2001 |
| JP | 55 115786 A | 9/1980 |
| JP | 07 177225 A | 7/1995 |
| WO | WO 95 24803 A1 | 9/1995 |

* cited by examiner

Primary Examiner—Ahmad F. Matar
Assistant Examiner—Quynh H. Nguyen
(74) Attorney, Agent, or Firm—Marc A. Hubbard; Munsch Hardt Kopf & Harr PC

(57) ABSTRACT

Apparatus of facilitating circuit card replacement without down time, comprising a redundancy connector assembly having a first connector and a second connector, a redundant bus, and a first circuit card coupled to the first connector of the redundancy connector assembly. The first circuit card has a logic circuit and a switch operable to selectively couple and decouple the logic circuit to one of the first connector and the redundant bus. A second circuit card also has a logic circuit and a switch operable to selectively couple and decouple the logic circuit to the redundant bus. A bypass cable is used to couple the second connector of the redundancy connector assembly to the second circuit card during replacement of the first circuit card and routing signals destined for the first circuit card to the second circuit card.

10 Claims, 6 Drawing Sheets

APPARATUS AND METHOD OF REPLACING TELEPHONY CARDS WITHOUT DOWN TIME

TECHNICAL FIELD OF THE INVENTION

This invention relates to telecommunications network and equipment, and more particularly, to apparatus and a method of replacing telephony cards without down time.

BACKGROUND OF THE INVENTION

Telecommunications equipment is often provided with backup and redundant system components to avoid dropping connections when faults are encountered. Typically, a redundant component or circuit card is automatically switched into service when a fault is experienced in a circuit card or component. In this case, the traffic is forwarded from the faulty card to the redundant card or component. However, the system may still need to be taken off-line to service the faulty component or card or to replace it. This is typically done during times when there is light traffic, for example 2:00 A.M., so that as few as possible calls are affected. Because of the global nature of the Internet and businesses that operate globally, the hours during which traffic light is becoming more scarce and more than a desirable number of calls are still affected. Therefore, it is preferable to service the system with no traffic down time at all.

SUMMARY OF THE INVENTION

In accordance with an embodiment of the present invention, an apparatus of facilitating circuit card replacement without down time is provided. The apparatus comprises a redundancy connector assembly having a first connector and a second connector, a redundant bus, and a first circuit card coupled to the first connector of the redundancy connector assembly. The first circuit card has a logic circuit and a switch operable to selectively couple and decouple the logic circuit to one of the first connector and the redundant bus. A second circuit card also has a logic circuit and a switch operable to selectively couple and decouple the logic circuit to the redundant bus. A bypass cable is used to couple the second connector of the redundancy connector assembly to the second circuit card during replacement of the first circuit card and routing signals destined for the first circuit card to the second circuit card.

In accordance with another embodiment of the present invention, a method of replacing a telephony circuit card without down time includes the steps of automatically detecting fault in the telephony circuit card and routing telephony data from a telephony data source via a redundant bus to a redundant circuit card, the telephony circuit card being coupled to a first connector of a redundant connector assembly. The method also includes the step of coupling a bypass cable to a second connector of the redundant connector assembly coupled to the telephony circuit card and to the redundant circuit card, routing the telephony data via the bypass cable from the redundant connector assembly to the redundant circuit card, removing the telephony circuit card from the redundant connector assembly. Thereafter, a working telephony circuit card is coupled to the redundant connector assembly, and the telephony data is routed to the working telephony circuit card via the redundant connector assembly. The bypass cable is then removed.

In accordance to yet another embodiment of the present invention, a method of replacing a telephony circuit card without down time includes the steps of automatically detecting fault in the telephony circuit card and automatically connecting a telephony data source to a redundant bus coupled to logic circuits of a backup circuit card, thereby routing telephony data to the logic circuits of the backup circuit card via the redundant bus, coupling a bypass cable to between a redundant connector assembly coupled to the telephony circuit card and the backup circuit card, and connecting the logic circuits of the backup circuit card to the bypass cable, thereby routing telephony data to the logic circuits of the backup circuit card via the bypass cable. The telephony circuit card is then removed and replaced with a working telephony circuit card by coupling it to its redundant connector assembly. The logic circuits of the working telephony circuit card are then coupled to the redundant connector assembly, and the logic circuits of the backup circuit card are decoupled from the bypass cable. In yet another embodiment of the present invention, a redundancy circuit apparatus includes a redundancy connector assembly coupled to a telephony card, which includes a first connector having a plurality of pins operable to couple to a circuit card, a second connector having a plurality of pins operable to couple a bypass cable, a third connector having a plurality of pins operable to couple a data source to the bypass cable or to the circuit card, and the bypass cable is operable to couple the data source coupled to the third connector to a backup circuit card.

BRIEF DESCRIPTION OF THE DRAWINGS

For a more complete understanding of the present invention, the objects and advantages thereof, reference is now made to the following descriptions with reference to the accompanying drawings in which.

DETAILED DESCRIPTION OF THE DRAWINGS

The preferred embodiment of the present invention and its advantages are best understood by referring to FIGS. 1 through 6, where like numerals are used for like and corresponding parts.

Figure 1:
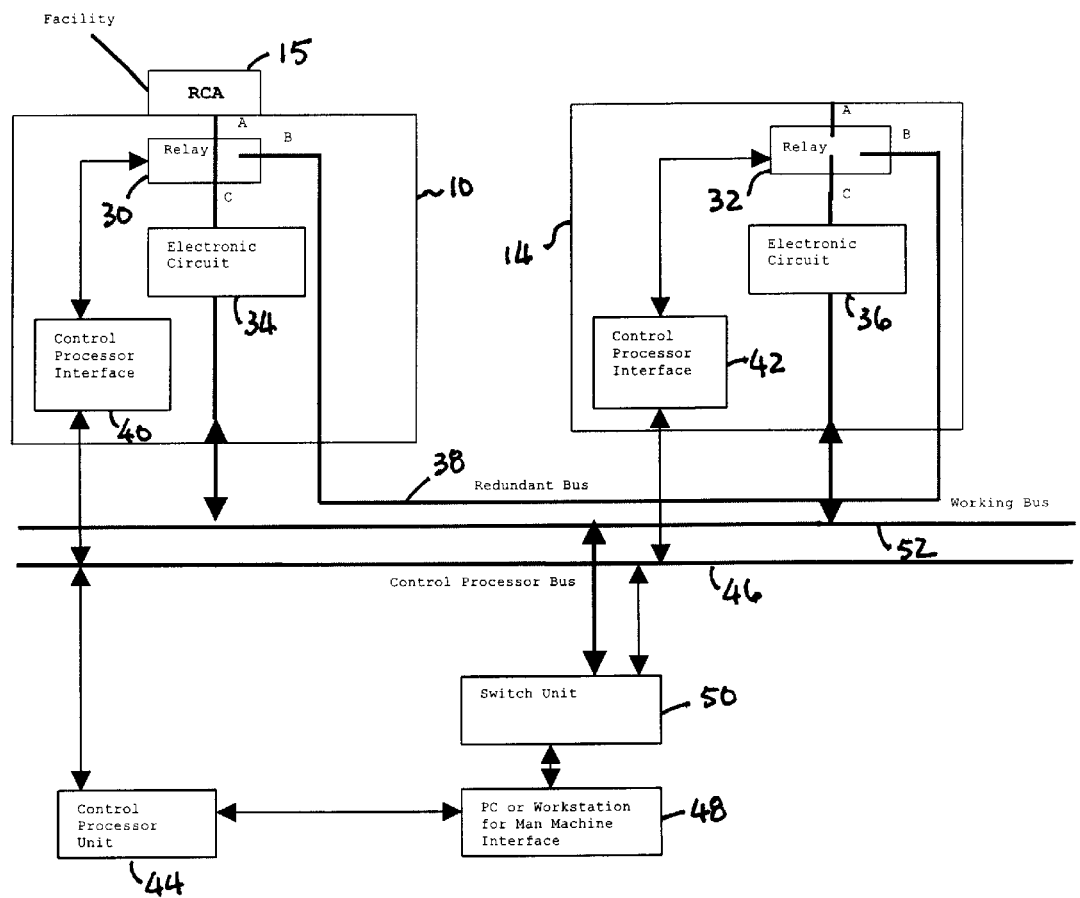
FIG. 1 is a simplified block diagram of a telephony card with a redundant card, the telephony card connected to a redundancy connector assembly.
Figure 2:
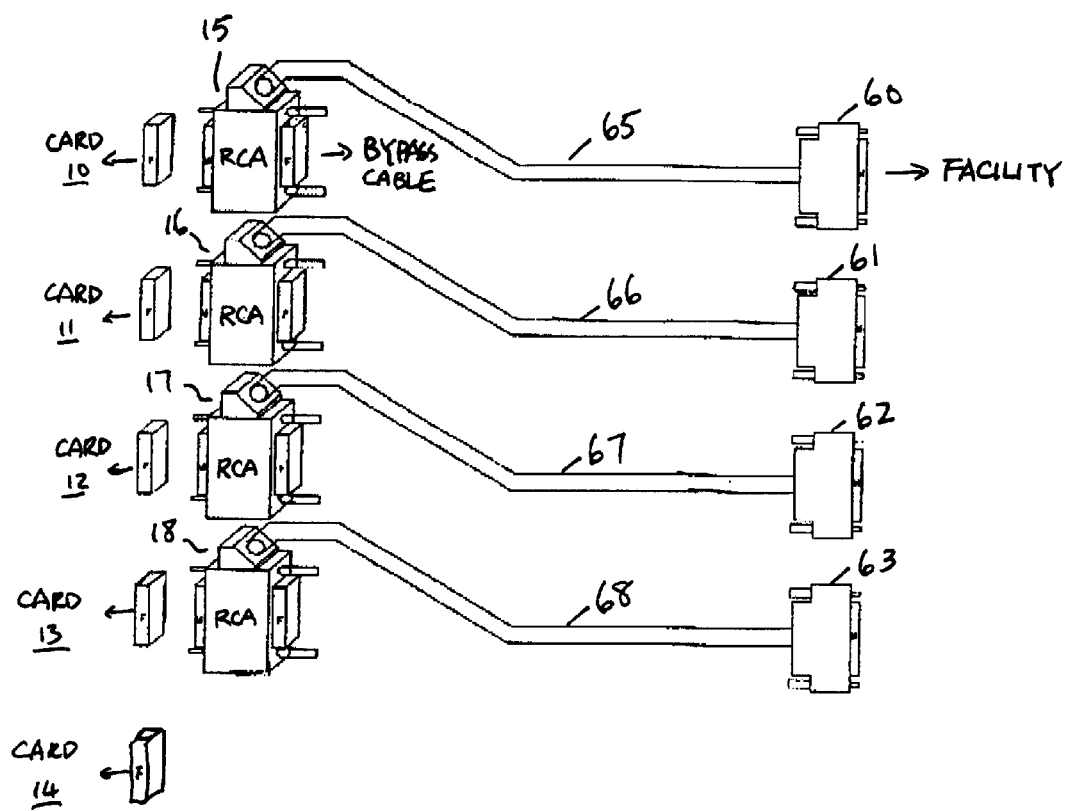
FIG. 2 is a more detailed view of redundancy connector assemblies.

FIGS. 1 and 2 are simplified diagrams of telephony cards 10–13 with a redundant card 14 in a N+1 redundancy scheme, each connected to a redundancy connector assembly (RCA) 15–18. Telephony cards 10–14 may be T1 network interface circuit cards resident in a telecommunications switch (not shown), but may be any other circuit card or component that carries live telephony traffic. To avoid unnecessary clutter, FIG. 1 shows only one card 10 with redundant card 14. Each card 10 and 14 includes a three position relay switch 30 and 32 operable to connect or disconnect a respective electronic circuit 34 and 36 to redundancy connector assembly 15 and card 14, or to a redundant bus 38 interconnecting the card 10 and redundant card 14. In one embodiment of the present invention, redundant bus 38 is a mid-plane bus that interconnects all telephony cards 10–14. Relay switches 30 and 32 are controlled by control signals generated by respective control processor interfaces 40 and 42. Control processor interfaces 40 and 42 communicate with a control processor unit 44 over a control processor bus 46. Control processor unit 44 is further coupled to a personal computer or workstation man-machine interface 48. Switch unit 50 is the telephony data switching matrix which communicates with electronic circuits 34 and 36 of network interface cards 10 and 14 via a working bus 52. Redundancy connector assembly 15 is further connected to facility or external patch panel via connectors 60 and cables 65.

Redundant connector assembly 15 includes three connectors. In one embodiment of the present invention, redundancy connector assemblies 15 includes a male connector for connecting to the female connector on network interface card 10, and a female connector for connecting to a bypass cable (76 shown in FIG. 4) used during telephony card replacement. Connector 60 is a male connector for connecting to external patch panel.

During normal operation, the relay switch of each network interface card connects the logic on the card to the respective redundancy connector assembly. In other words, the relay switch connects terminal A to terminal C in the cards. The redundant card relay switch, on the other hand, does not connect the logic on the card to terminal A or terminal B. Therefore, telephony traffic does not go through the redundant card.

Figure 3:
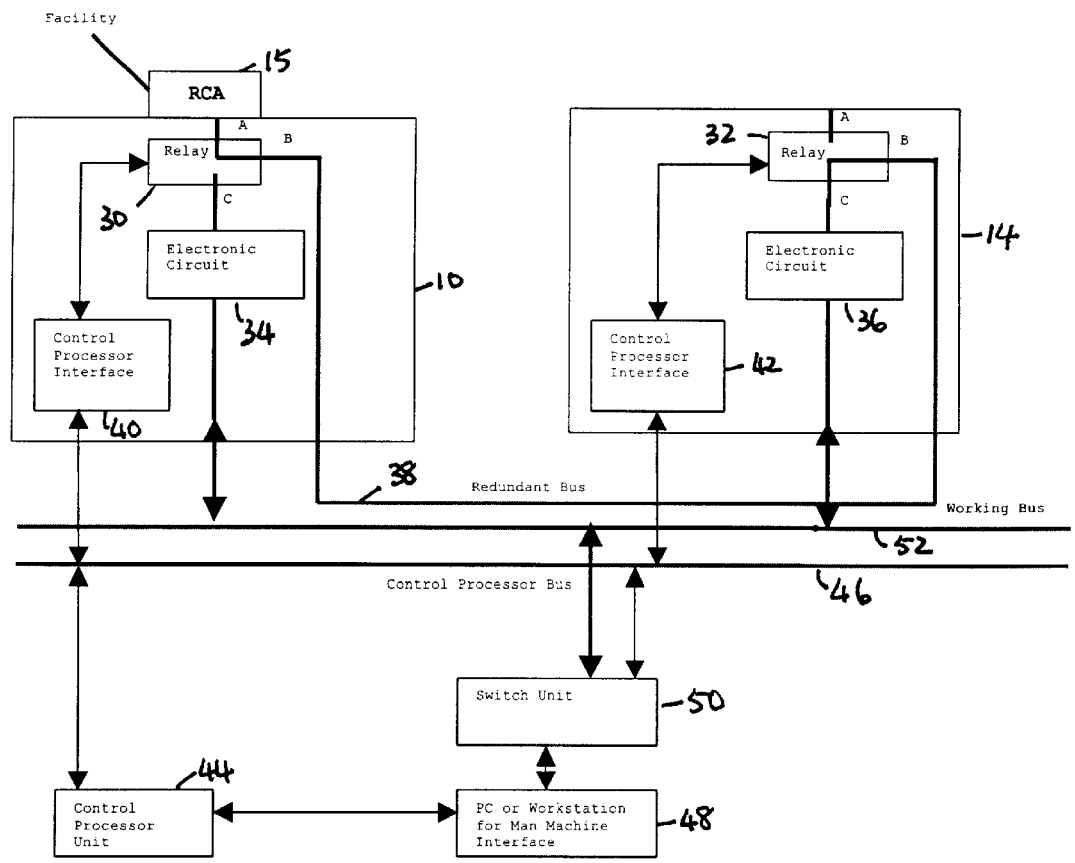
FIG. 3 is a simplified block diagram of a faulty telephony card forwarding traffic to the redundant card.

In the N+1 redundancy scheme, one network interface card functions as backup for N cards. When there is a fault associated with one of the cards 10–13, traffic carried by the faulty card is immediately forwarded to redundant card 14 via the relay switch. This scenario is shown in FIG. 3, when fault is detected, the faulty telephony card 10 forwards the traffic to the redundant card 14. Relay switch 30 of faulty card 10 is shown connecting terminals A and B thereby forwarding the traffic to redundant card 14 via redundant bus 38. Relay switch 32 in redundant card 14 now connects terminal C to terminal B, thereby connecting redundant bus 38 to electronic circuit 36 on redundant card. Relay switches 30 and 32 are controlled by control signals originating from control processor unit 44. Control processor unit 44 instructs switch unit 50 via control processor bus 46 to send and receive traffic to and from the redundant card 14 instead of the faulty card 10. Conventional fault detection methods may be used to trigger relay switch actions.

Figure 4:
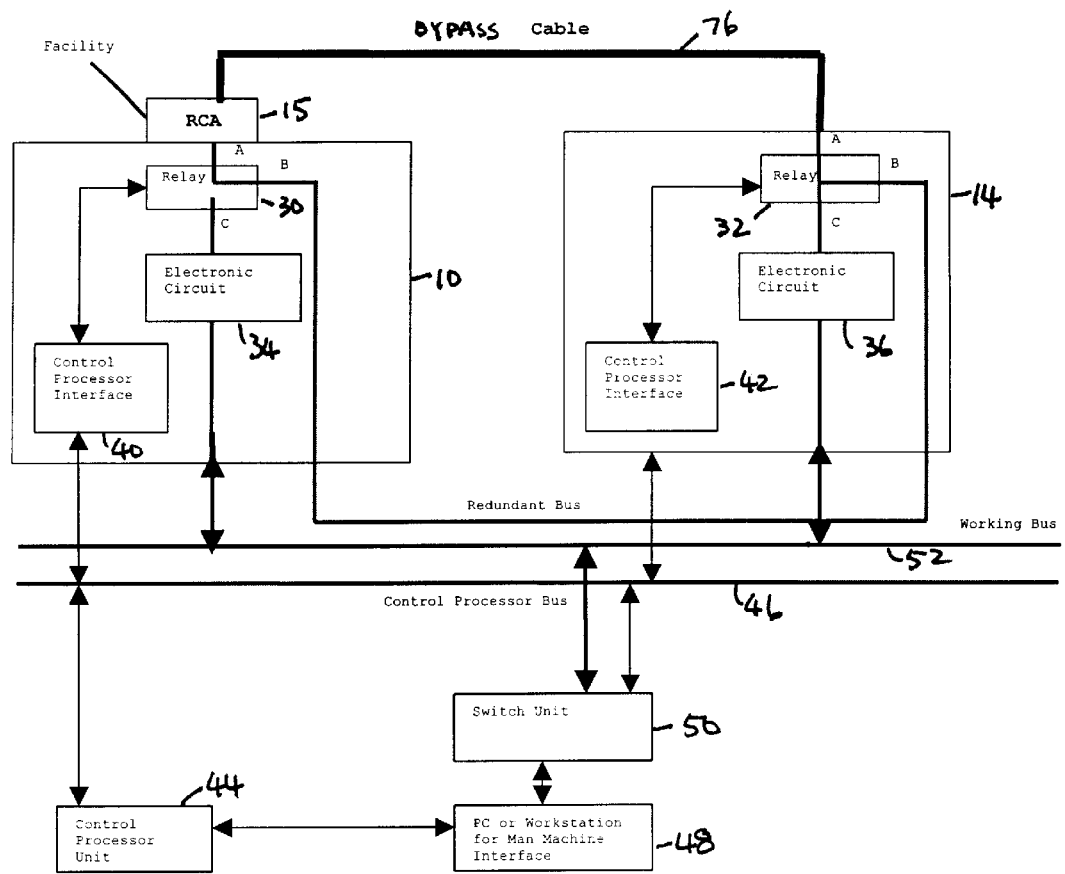
FIG. 4 is a simplified block diagram of a faulty telephony card forwarding traffic to the redundant card and readied for replacement.

FIG. 4 is a simplified block diagram of a faulty telephony card 10 forwarding traffic to the redundant card 14 and being readied for replacement. Upon notification of the occurrence of a fault, craft personnel prepares to replace the faulty card. The craft sends a request via man-machine interface 48 to switch unit 50 to send and receive signals to and from facility. Further, the craft connects an external bypass cable 76 to redundancy connector assembly 15 and instructs control processor unit 44 to send control signals to relay switch 32 to connect the A, B and C terminals together. Bypass cable 76 functions as a jumper cable that connects the redundancy connector assembly of the faulty card to the redundant card.

Figure 5:
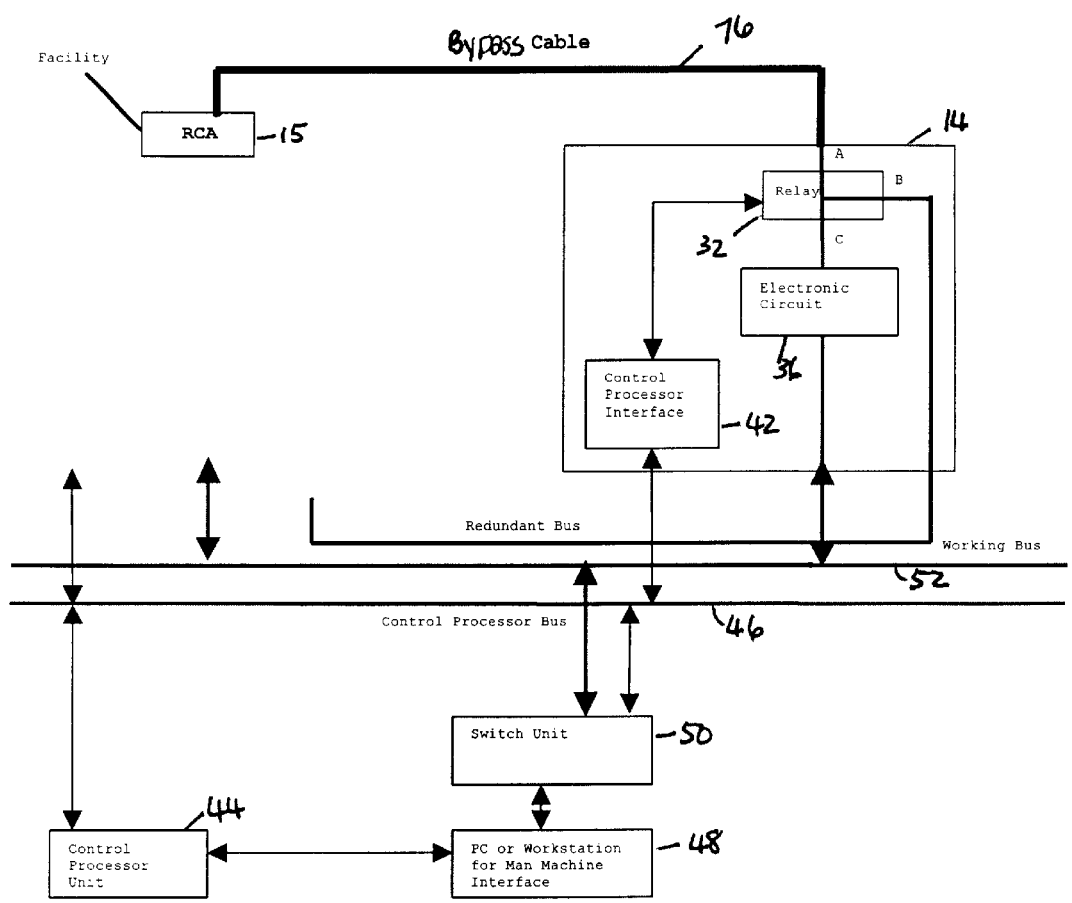
FIG. 5 is a simplified block diagram showing the faulty telephony card removed and the traffic being carried by the redundant card.

FIG. 5 is a simplified block diagram showing the faulty telephony card removed and the traffic being carried by the redundant card 14. The faulty network interface card is manually removed by the craft. Since bypass cable 76 connects redundancy connector assembly 15 to redundancy card 14, the facility signals are still routed through bypass cable 76 to electronic circuit 36 of redundant card 14. No down time is experienced.

Figure 6:
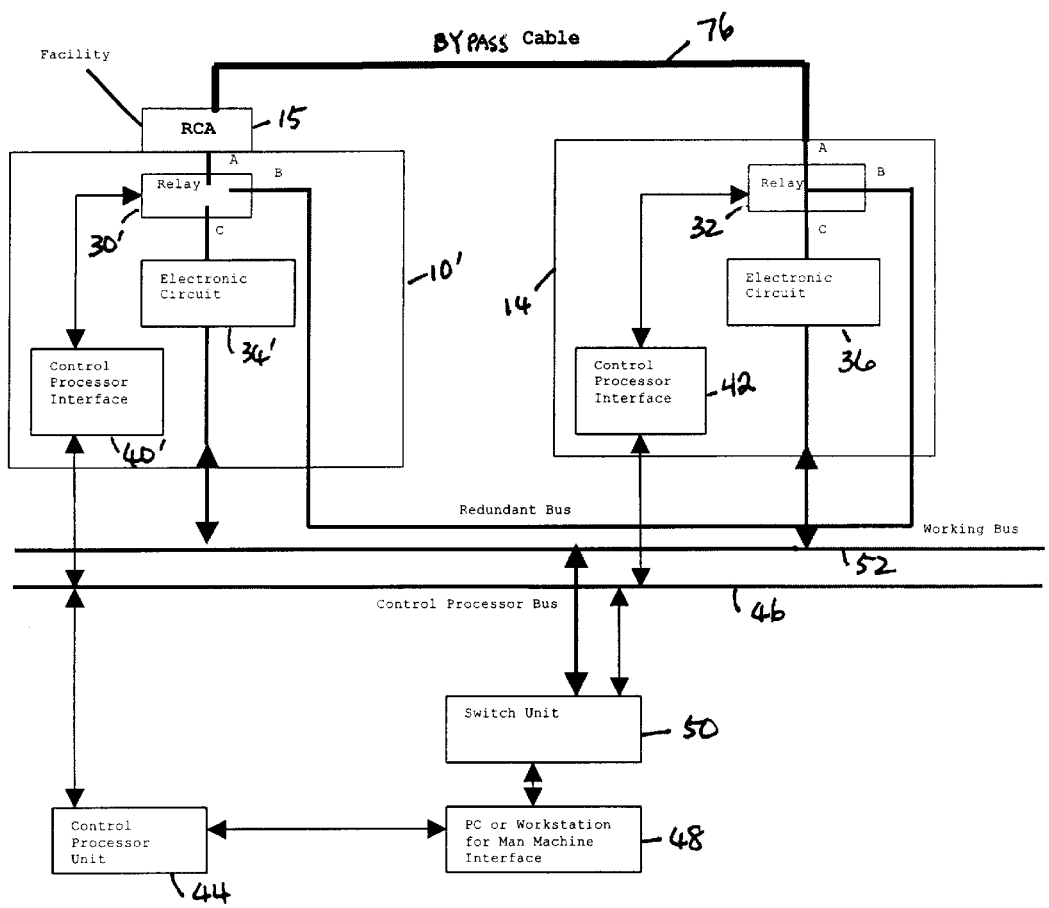
FIG. 6 is a simplified block diagram of a replacement telephony card being put in place and tested.

FIG. 6 is a simplified block diagram of a replacement telephony card 10' being installed and tested. Replacement card 10' is manually installed with its relay switch 30' disconnecting the A, B and C terminals. Diagnostic testing may be performed via craft instructions entered at man machine interface 48 and carried out by control processor unit 44.

After testing is completed and the replacement card performs satisfactorily, relay switch 30' of the replacement card is instructed to connect the A terminal to the C terminal, so that facility signals go through both cards 10' and 14. Thereafter, relay switch 32 of redundant card 14 is instructed to disconnect the A, B and C terminals. When configured this way, facility signals are again carried by the card 10' and the redundant card 14 is taken out of the path. Control processor unit 44 instructs switch unit 50 via control processor bus 46 to send and receive traffic to and from the replacement card 10' instead of the redundancy card 14. Bypass cable 76 is then removed from the redundancy connector assemblies. The cards and redundancy card are thus returned to normal operation.

In an alternate embodiment, the redundancy connector assemblies may contain switching capabilities to connect, for example, the electronic circuit to the facility.

It may be noted that in an N+1 redundancy scheme, only one faulty card at a time is protected. Therefore, a faulty card should be replaced as soon as practicable. Also note that for the N+1 redundancy scheme, N can be of value 1 or more.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. Apparatus of facilitating circuit card replacement without down time, comprising:

a redundancy connector assembly, the redundancy connector assembly having a first connector and a second connector;

a redundant bus;

a first circuit card coupled to the first connector of the redundancy connector assembly, the first circuit card having a logic circuit and a switch operable to selectively couple and decouple the logic circuit to one of the first connector and the redundant bus;

a second circuit card having a logic circuit and a switch operable to selectively couple and decouple the logic circuit to the redundant bus, and a bypass cable operable to couple the second connector of the redundancy connector assembly to the second circuit card during replacement of the first circuit card and routing signals destined for the first circuit card to the second circuit card.

2. The apparatus, as set forth in claim 1, wherein the redundancy connector assembly comprises a third connector operable to couple to a data source, the switch in the first circuit card further being operable to selectively couple and decouple the data source to one of the redundant bus and the logic circuit on the first circuit card.

3. The apparatus, as set forth in claim 1, further comprising:
- a plurality of redundancy connector assemblies;
- a plurality of first circuit cards coupled to the first connectors of the plurality of redundancy connector assemblies; and
- the plurality of first circuit cards being protected by the second circuit card in an N+1 redundancy scheme.

4. A method of replacing a telephony circuit card without down time, comprising:
- automatically detecting fault in the telephony circuit card and routing telephony data from a telephony data source via a redundant bus to a redundant circuit card, the telephony circuit card being coupled to a first connector of a redundant connector assembly;
- coupling a bypass cable to a second connector of the redundant connector assembly coupled to the telephony circuit card and to the redundant circuit card;
- routing the telephony data via the bypass cable from the redundant connector assembly to the redundant circuit card;
- removing the telephony circuit card from the redundant connector assembly;
- coupling a working telephony circuit card to the redundant connector assembly;
- routing the telephony data to the working telephony circuit card via the redundant connector assembly; and
- removing the bypass cable.

5. The method, as set forth in claim 4, wherein automatically detecting fault in the telephony circuit card and routing telephony data comprises:
- coupling the telephony data source coupled to the redundant connector assembly of the telephony circuit card to the redundant bus; and
- coupling the redundant circuit card to the redundant bus.

6. The method, as set forth in claim 4, wherein routing the telephony data via the bypass cable comprises coupling logic circuits of the redundant circuit card to the bypass cable.

7. The method, as set forth in claim 4, wherein routing the telephony data to the working circuit card comprises:
- coupling logic circuits of the working telephony circuit card to the redundant connector assembly and the telephony data source; and
- decoupling logic circuits of the redundant circuit card from the redundant bus.

8. A method of replacing a telephony circuit card without down time, comprising:
- automatically detecting fault in the telephony circuit card and automatically connecting a telephony data source to a redundant bus coupled to logc circuits of a backup circuit card, thereby routing telephony data to the logic circuits of the backup circuit card via the redundant bus;
- coupling a bypass cable to between a redundant connector assembly coupled to the telephony circuit card and the backup circuit card, and connecting the logic circuits of the backup circuit cud to the bypass cable, thereby routing telephony data to the logic circuits of the backup circuit card via the bypass cable;
- removing the telephony circuit card;
- coupling a working telephony circuit card to its redundant connector assembly;
- coupling the logic circuits of the working telephony circuit card to the redundant connector assembly, and decoupling the logic circuits of the backup circuit card from the bypass cable.

9. A redundancy circuit apparatus, comprising:
- a redundancy connector assembly couple to a telephony card, including:
    - a first connector having a plurality of pins operable to couple to a circuit card;
    - a second connector having a plurality of pins operable to couple a bypass cable;
    - a third connector having a plurality of pins operable to couple a data source to the bypass cable or to the circuit card; and
- the bypass cable operable to couple the data source coupled to the third connector to a backup circuit card;
- wherein the telephony card comprises a relay switch operable to selectively couple and decouple logic circuits of the telephony card to the redundancy connector assembly and a redundant bus coupled to the telephony card and the backup circuit card.

10. A telephony device, comprising:
- at least one telephony card coupled with a working bus and a redundant bus;
- the at least telephony card being further coupled to a telephony data source through a connector assembly to which a bypass cable may be connected for coupling the telephony data source to a redundant card; and
- a switch for selectively coupling the telephony data source to the redundant bus and to a logic circuit on the telephony card;
- the redundant card being coupled to the redundant bus and including a switch for selectively communicating with the telephony data source through the redundant bus and, when connected to the redundant card, the bypass cable.

* * * * *